(12) United States Patent
Kumiya et al.

(10) Patent No.: US 8,483,878 B2
(45) Date of Patent: Jul. 9, 2013

(54) METHOD AND APPARATUS FOR PREDICTING INTERFERENCE BETWEEN TARGET SECTION OF ROBOT AND PERIPHERAL OBJECT

(75) Inventors: Hidetoshi Kumiya, Yamanashi (JP); Kyouhei Kokubo, Yamanashi (JP)

(73) Assignee: Fanuc Corporation (JP)

( * ) Notice: Subject to any disclaimer, the term of this patent is extended or adjusted under 35 U.S.C. 154(b) by 0 days.

(21) Appl. No.: 13/442,983

(22) Filed: Apr. 10, 2012

(65) Prior Publication Data

US 2012/0265342 A1    Oct. 18, 2012

(30) Foreign Application Priority Data

Apr. 18, 2011  (JP) ................. 2011-092413

(51) Int. Cl.
*G05B 19/04* (2006.01)
*G06F 19/00* (2011.01)

(52) U.S. Cl.
USPC ............................ 700/255; 700/245; 700/250

(58) Field of Classification Search
USPC ......................... 700/245, 250, 255
See application file for complete search history.

(56) References Cited

U.S. PATENT DOCUMENTS 8,185,265 B2    5/2012   Nagano

FOREIGN PATENT DOCUMENTS

| JP | 9027046 A | 1/1997 |
|---|---|---|
| JP | 2000326280 A | 11/2000 |
| JP | 2002273675 A | 9/2002 |
| JP | 2002331480 A | 11/2002 |
| JP | 2004280635 A | 10/2004 |
| JP | 2008-188694 A | 8/2008 |
| JP | 2010155328 A | 7/2010 |

OTHER PUBLICATIONS

C. Bradford Barber et al., "The Quickhull Algorithm for Convex Hulls", ACM Translations on Mathematical Software, vol. 22, No. 4, pp. 469-483, Dec. 1996.
JP Office Action, dated Aug. 14, 2012, issued in JP Application No. 2011-092413.

*Primary Examiner* — Khoi Tran
*Assistant Examiner* — Robert Nguyen
(74) *Attorney, Agent, or Firm* — Lowe Hauptman Ham & Berner, LLP

(57) ABSTRACT

A method and an apparatus for predicting interference, at practical accuracy and calculation time, between a target section of a robot and a peripheral object installed around the robot, when the target section, such as a tool or a sensor attached to a robot hand, is moved along a movement path thereof due to the motion of the robot. A convex hull, defined by areas occupied by the tool at adjacent time points, is calculated. It is judged whether a common area exists between the convex hull and a polyhedron area. When the common area exists, it is judged that the tool interferes with the container box on the movement path, and the procedure is terminated. When the common area does not exist, it is judged whether j<n is true. If j≧n is true, it is judged that the interference does not occur.

2 Claims, 6 Drawing Sheets

METHOD AND APPARATUS FOR PREDICTING INTERFERENCE BETWEEN TARGET SECTION OF ROBOT AND PERIPHERAL OBJECT

RELATED APPLICATIONS

The present application is based on, and claims priority from, Japanese Application Number 2011-092413, filed Apr. 18, 2011, the disclosure of which is hereby incorporated by reference herein in its entirety.

BACKGROUND OF THE INVENTION

1. Field of the Invention

The present invention relates to a method and apparatus for predicting interference between a target section of a robot and a peripheral object such as external equipment or a fence installed around the robot, when the target section, such as a tool or a sensor attached to a hand of the robot, is moved along a movement path thereof due to the motion of the robot.

2. Description of the Related Art

In a picking operation wherein a robot picks up a workpiece by using a vision sensor, the position and orientation of a workpiece are measured by the vision sensor, and a moving path of the robot for gripping the workpiece is generated based on the measurement result. Since a movement path of the robot is also changed when the position and orientation of the workpiece are changed, the possibility of interference in the movement path, between a target section, such as a tool or a sensor attached to a hand of the robot, and a peripheral object such as external equipment or a fence fixed around the robot, may be varied.

When a plurality of workpieces are randomly piled, a movement path of the robot is generated in relation to each workpiece measured by the vision sensor. It is preferable that interference is predicted in relation to a plurality of generated movement paths, and the robot grips a workpiece corresponding to the movement path in which it is judged that the interference does not occur. In one conventional technique to predict the interference, the interference between the target section of the robot and the peripheral object is judged at a movement terminal point of the movement path. For example, Japanese Unexamined Patent Publication (Kokai) No. 2000-326280 (JPP'280) discloses a method for checking an interference of a SCARA robot, wherein a command relating to a target position of the robot is converted into a stroke value of each joint axis, a limit of the stroke of each robot is checked, the command relating to the target point of the robot is converted into a position on a Cartesian space, and an interference area on the Cartesian space is checked. Then, when it is judged that the target position satisfies conditions relating to the stroke limit and the interference area, a motion command for each joint axis is given.

Japanese Unexamined Patent Publication (Kokai) No. 2002-331480 (JPP'480) discloses an interference avoiding apparatus for avoiding interference between a robot and another object. Paragraph [0024] of JPP'480 recites that a memory of robot controller 6 stores information of the shape of tool 3, information of the shape and the position/orientation of container box 4, position/orientation Wn of workpiece 10 when teaching, and position/orientation Tn of the tool, and then it can be judged whether or not interference between tool 3 and container box 4 occurs based on the information of the shape of the tool in position/orientation Ta calculated by equation (1) and the information of the shape and the position/orientation of container box 4.

As another conventional technique for predicting interference, Japanese Unexamined Patent Publication (Kokai) No. 2002-273675 (JPP'675) discloses a device and a system for controlling a robot capable of carrying out an automated teaching operation, wherein interference between a robot and a member on an operation path is judged by simulating the motion of the robot in a predetermined operation. Then, in case that it is judged that a robot arm or a tool attached to a front end of the robot arm interferes with the member, when a length of a section of the interference does not exceed a predetermined threshold, the operation path of the robot is divided at the interference point, and the robot is moved within the divided operation path.

As another conventional technique, Japanese Unexamined Patent Publication (Kokai) No. 9-27046 (JPP'046) discloses a method for checking interference between a non-convex polyhedron and another article, wherein a convex hull of the non-convex polyhedron is generated, interference between the convex hull and the article is checked, and then, when the interference occurs, the convex hull is removed. The method includes steps of: dividing apexes constituting the non-convex polyhedron into a plurality of groups, the difference between the apexes in each group in relation to a first axis (for example, an X-axis) being equal to zero or less than a minimal value $\epsilon$; generating a two-dimensional convex hull on a second-third axis plane (for example, a Y-Z plane) in relation to each groups of apexes; generating a three-dimensional convex hull by combining the adjacent two-dimensional convex hulls; and generating the intended non-convex polyhedron by sequentially combining the adjacent three-dimensional convex hulls.

As another conventional technique, Japanese Unexamined Patent Publication (Kokai) No. 2004-280635 (JPP'635) discloses a simulation apparatus for simulating the motion of a plurality of robots, having a path information storing means for storing coordinate values and simulation time of a plurality of polyhedrons representing the shape of a path of each robot model after the robot is operated for a predetermined period of time; and an interference detecting means for inputting three-dimensional coordinate values and time of the plurality of polyhedrons into respective spread sheets, and for detecting a polyhedron by calculation which simultaneously and spatially interferes with the plurality of sheets.

In the technique of JPP'280 or JPP'480, it is difficult to detect or predict interference on the movement path, although interference at the movement terminal position may be detected. For example, in FIG. 2 of JPP'480 showing a movement path of tool 3 when workpiece 7 in container box 4 is picked, although tool 3 does not interfere with box 4 at movement terminal time T4, tool 3 may interfere with box 4 between time T2 and T3 when moving.

On the other hand, in the technique of JPP'675, in order to precisely predict interference on the generated movement path, it is sequentially judged whether a target section of the robot interferes with a peripheral object in relation to all interpolation positions. However, this technique requires excessively long calculation time, and thus is not appropriate for predicting interference in real time during the motion of the robot.

The technique of JPP'046 utilizes a convex hull in predicting interference. However, this technique predicts interference between polyhedrons in the stationary condition, and thus cannot be used for moving polyhedrons.

In the technique of JPP'635, when a plurality of robots and a machine tool/jig are simultaneously operated, interference between calculated polyhedrons is judged instead of interference between the robots, each polyhedron covering a motion range of each robot. However, since the polyhedron corresponding to the motion range is not limited to a convex polyhedron, calculation for judging the interference is complicated and takes a long time. Therefore, the technique of JPP'635 is not appropriate for judging the interference in real time during the motion of the robot.

SUMMARY OF THE INVENTION

An object of the present invention is to provide a method and an apparatus for predicting interference, at practical accuracy and calculation time, between a target section of a robot and a peripheral object such as external equipment or a fence installed around the robot, when the target section, such as a tool or a sensor attached to a hand of the robot, is moved along a movement path thereof due to the motion of the robot.

According to one aspect of the present invention, a method for predicting interference is provided, wherein the method comprising the steps of: storing a peripheral occupied area which is an area occupied by a peripheral approximated polyhedron which is a polyhedral approximation of a shape of a peripheral object fixed in a space, and a target section approximated polyhedron which is a polyhedral approximation of a target section of a robot; calculating a plurality of target section occupied areas which are occupied by the target section approximated polyhedron at a plurality of time points, according to the motion of the robot; and predicting interference between the target section of the robot and the peripheral object based on the plurality of target section occupied areas and the peripheral occupied area, wherein the method comprises the steps of: calculating all convex hulls which are combinations of adjacent target section occupied areas when the plurality of target section occupied areas are aligned according to the order of the plurality of time points; calculating the peripheral occupied area as a combination of convex polyhedrons; and judging whether the interference between the target section of the robot and the peripheral object occurs, by judging whether a common area exists between any of the convex hulls and the convex polyhedrons.

According to another aspect of the present invention, an apparatus for predicting interference is provided, wherein the apparatus comprising: a storing part configured to store a peripheral occupied area which is an area occupied by a peripheral approximated polyhedron which is a polyhedral approximation of a shape of a peripheral object fixed in a space, and a target section approximated polyhedron which is a polyhedral approximation of a target section of a robot; a target section occupied area calculating part configured to calculate a plurality of target section occupied areas which are occupied by the target section approximated polyhedron at a plurality of time points, according to the motion of the robot; and an interference predicting part configured to predict interference between the target section of the robot and the peripheral object based on the plurality of target section occupied areas and the peripheral occupied area, wherein the interference predicting part comprises: a convex hull calculating part configured to calculate all convex hulls which are combinations of adjacent target section occupied areas when the plurality of target section occupied areas are aligned according to the order of the plurality of time points; and a peripheral occupied area calculating part configured to calculate the peripheral occupied area as a combination of convex polyhedrons, and wherein the interference predicting part judges whether the interference between the target section of the robot and the peripheral object occurs, by judging whether a common area exists between any of the convex hulls and the convex polyhedrons.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
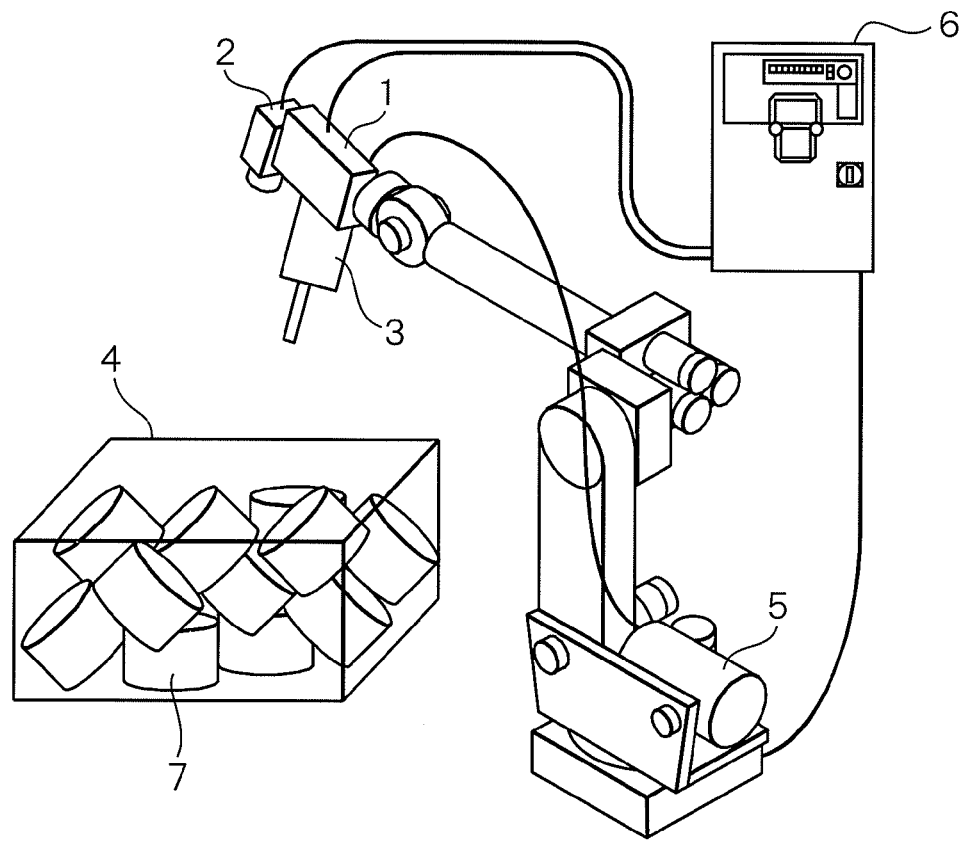
FIG. 1 shows a schematic configuration of an embodiment of an interference predicting apparatus according to the present invention.

FIG. 1 shows a schematic configuration of an embodiment of an interference predicting apparatus according to the present invention. In the present invention, "a target section of a robot" means a section including a body or an attachment of a robot arm, which may interfere with a peripheral object during the motion of the robot. In an embodiment, an interference predicting apparatus is constituted by arranging software for predicting interference within a robot controller 6. At a front end of a wrist of a robot 5, a tool 3 for picking up a workpiece 7, a camera 2 for capturing an image of workpiece 7, and a laser emitter 1 for emitting laser beam toward workpiece 7 are attached. Due to camera 2 and laser emitter 1, a three-dimensional vision sensor for detecting the position and orientation of workpiece 7 is constituted. In the embodiment, workpiece 7 is contained in a container box 4. In container box 4, a plurality of workpieces 7 are randomly piled, and thus the position and orientation of each workpiece 7 are random.

Robot 5, laser emitter 1, camera 2 and tool 3 may be conventional, and thus the detailed explanation thereof is omitted. Robot controller 6 may be conventional in that the controller has a processor, a ROM, a RAM, a non-volatile memory, an input means with a display, an I/O interface, a camera interface, and a servo controller for driving and controlling a servomotor of each robot axis. Robot 5 in FIG. 1 has six joint axes. When the position and orientation of tool 3 are commanded, robot controller 6 calculates a rotation angle of each joint axis of robot 5 and controls the motion of each axis so that tool 3 represents the commanded position and orientation. Laser emitter 1 and tool 3 are connected to the I/O interface, and camera 2 is connected to the camera interface.

Figure 2:
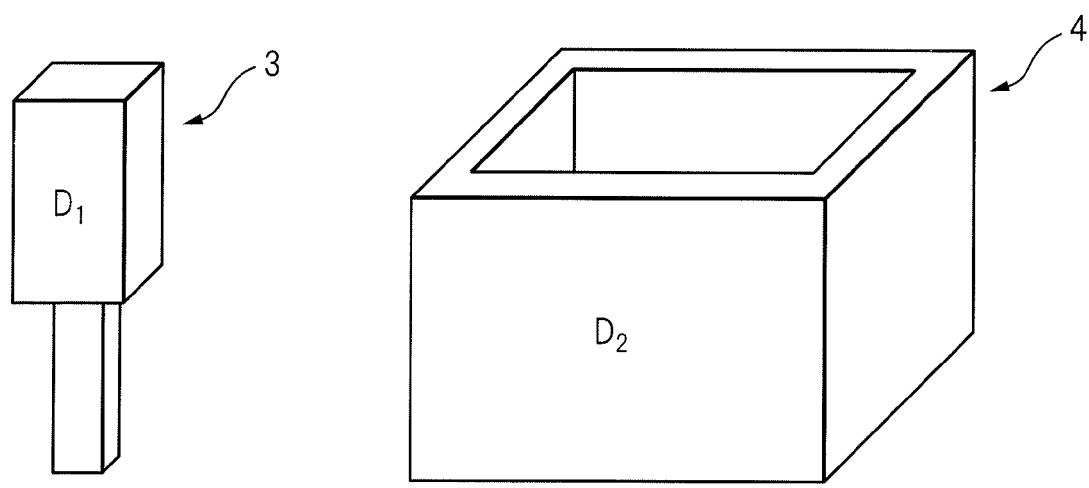
FIG. 2 shows an example wherein a tool and a container box are approximated by polyhedrons.

The position and orientation of tool 3 relative to the front end of the wrist of robot 5, the shape of tool 3, the position and orientation of container box 4, the shape of container box 4, the position and orientation of workpiece 7 when teaching, and the position and orientation of the tool for gripping workpiece 7 representing the position and orientation when the teaching, are previously determined and stored in a memory of robot controller 6. In relation to the shapes of tool 3 and container box 4 to be stored, as shown in FIG. 2, tool 3 is approximated by an area $D_1$ corresponding to a polyhedron constituted by combining two rectangular parallelepiped, and container box 4 is approximated by an area $D_2$ corresponding to a polyhedron constituted by removing a rectangular parallelepiped from another rectangular parallelepiped which is slightly larger than the former rectangular parallelepiped.

Figure 3:
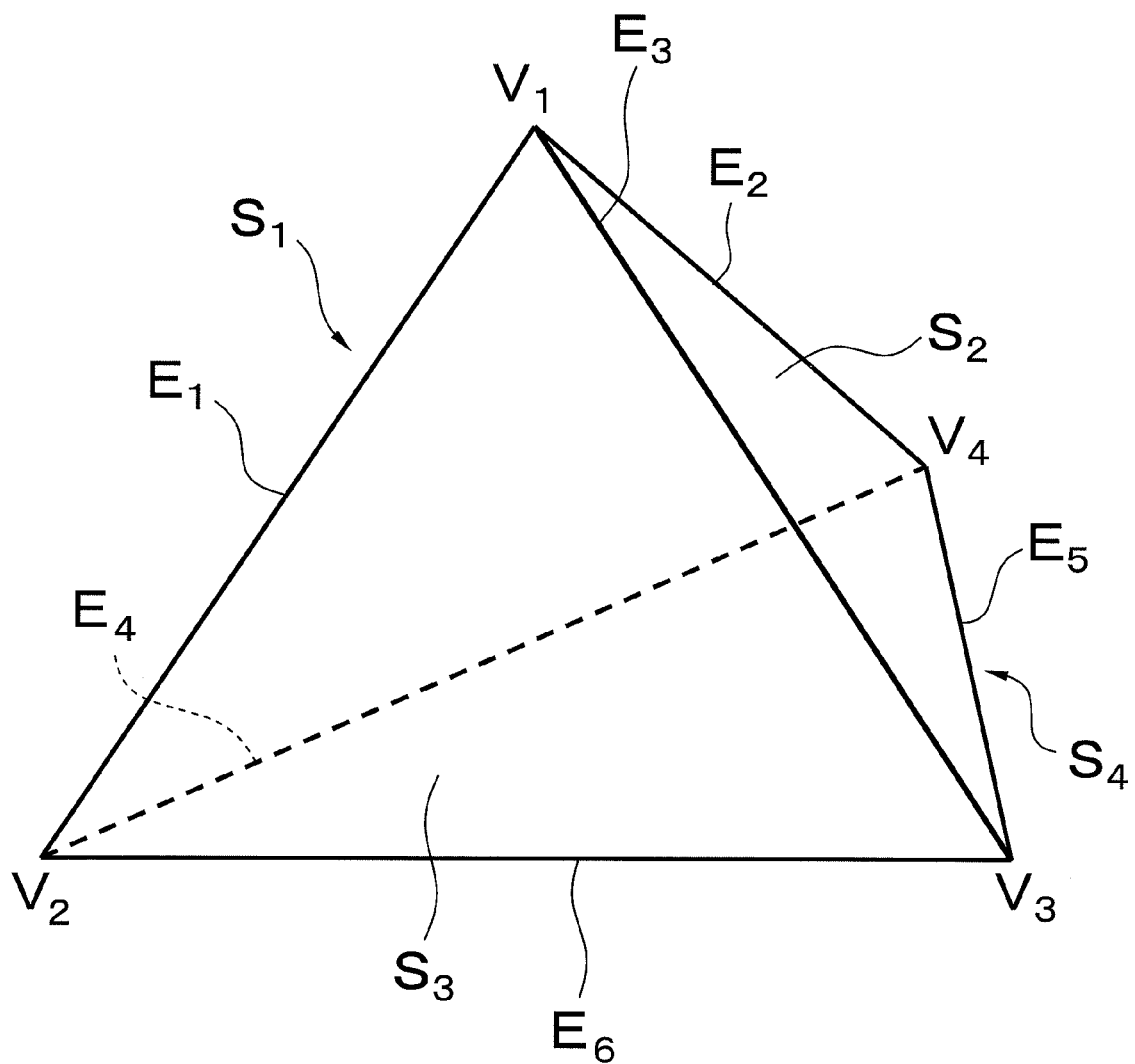
FIG. 3 shows an example wherein indexes are assigned to a regular tetrahedron as an example of a convex polyhedron.

Each of areas $D_1$ and $D_2$ may be represented as a combination of a plurality of rectangular parallelepipeds. In order to facilitate calculation for predicting interference, the approximated area is represented by a combination of convex polyhedrons. Concretely, an index is assigned to each apex and side of respective polyhedron area, and space coordinates of each apex, the indexes of the apexes at both end points of each side, and the indexes of sides of each surface of the polyhedron, are stored. For example, as shown in FIG. 3, when the approximated area is a regular tetrahedron (or a convex polyhedron), the length of each side of which is equal to 3, an index is assigned to each apex and side. Then, in a certain coordinate system, coordinate values (0.000, 0.000, 2.449), (1.732, 0.000, 0.000), (−0.866, 1.500, 0.000) and (−0.866, −1.500, 0.000) of apexes $V_1$, $V_2$, $V_3$ and $V_4$, respectively; indexes ($V_1$, $V_2$), ($V_1$, $V_4$), ($V_1$, $V_3$), ($V_2$, $V_4$), ($V_3$, $V_4$) and ($V_2$, $V_3$) of both end points of sides $E_1$, $E_2$, $E_3$, $E_4$, $E_5$ and $E_6$, respectively; and indexes of sides ($E_1$, $E_2$, $E_4$), ($E_2$, $E_3$, $E_5$), ($E_1$, $E_3$, $E_6$) and ($E_4$, $E_5$, $E_6$) which define surfaces $S_1$, $S_2$, $S_3$ and $S_4$, respectively, are stored.

Figure 4:
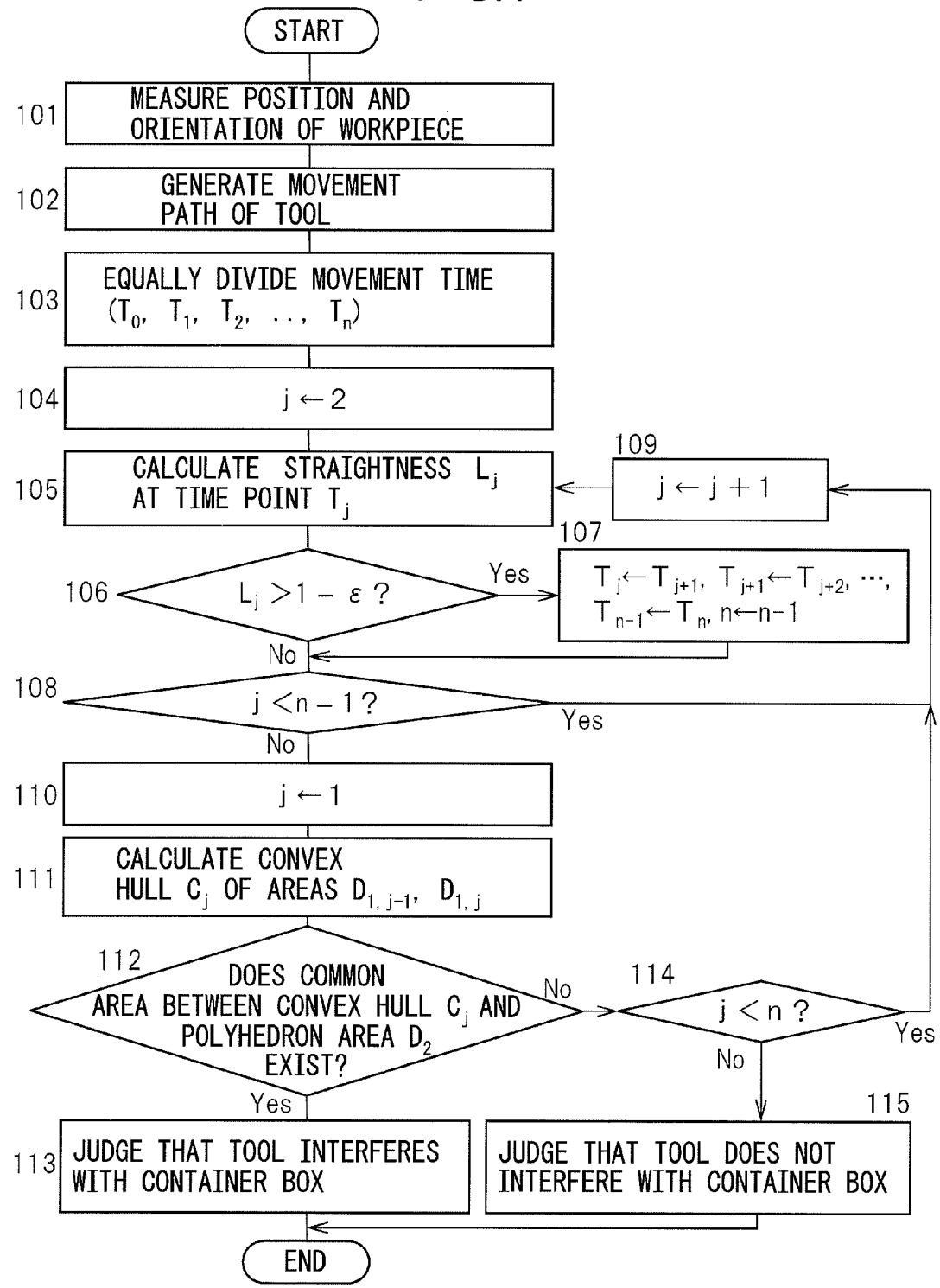
FIG. 4 is a flowchart showing the procedure for predicting interference, according to a method or an apparatus for predicting interference of the invention.

FIG. 4 shows a flowchart indicating the procedure for judging whether tool 3 interferes with container box 4 during picking operation of workpiece 7 by using robot 5. In this procedure, first, by means of a command from robot controller 6, robot 5 is moved so that an image of workpiece 7 in container box 4 can be captured, and then the position and orientation of the workpiece is measured by means of laser emitter 1 and camera 2 (step 101).

Next, the position and orientation of tool 3, by which tool 3 can grip measured workpiece 7 and take out the workpiece from container box 4, are calculated, based on the measured position and orientation of workpiece 7; the previously stored position and orientation of workpiece 7 when teaching; and the previously stored position and orientation of the tool when gripping the workpiece. Then, a movement path of tool 3 is generated (step 102), wherein the position and orientation when workpiece 7 is measured are determined as the position and orientation at the time of start of movement, and the position and orientation when measured workpiece 7 is gripped by tool 3 and taken out from container box 4 are determined as the position and orientation at the time of terminal of movement. There are various methods for generating the movement path. For example, in one method for generating the movement path, a rotation speed of each joint axis of the robot is constant. In other words, in this method, when a rotation angle of each joint axis k (k=1, 2, . . . , 6) of robot 5 at the time of start of movement is set to $\theta_k$; a rotation angle of each joint axis k at the time of terminal of movement is set to $\phi_k$; a time point of start of movement is set to 0 (zero); and a time point of terminal of movement is set to T, the rotation angle of each axis k at time point t (0≦t≦T) is equal to ($\theta_k + \Delta_k \times t$), wherein $\Delta_k = (\phi_k - \theta_k)/T$. This method is merely one example, and thus the application of predicting interference does not depend on the method for generating the movement path.

Next, a period of time from start to terminal of movement is divided into n equal parts, and obtained (n+1) time points are determined as $T_0$, $T_1$, . . . , $T_n$ (step 103). Time points $T_0$ and $T_n$ correspond to the time point of the start of movement and the time point of the terminal of movement, respectively. The division number "n" may be previously determined by considering an accuracy and/or processing time of the interference prediction, or may be sequentially determined based on the time of movement and the length of the movement path. As the division number is increased, the accuracy of the interference prediction is improved, however, the processing time is increased generally proportional to the division number. In order to predict the interference in real time, it is preferable that the processing time be short as possible.

Figure 5:
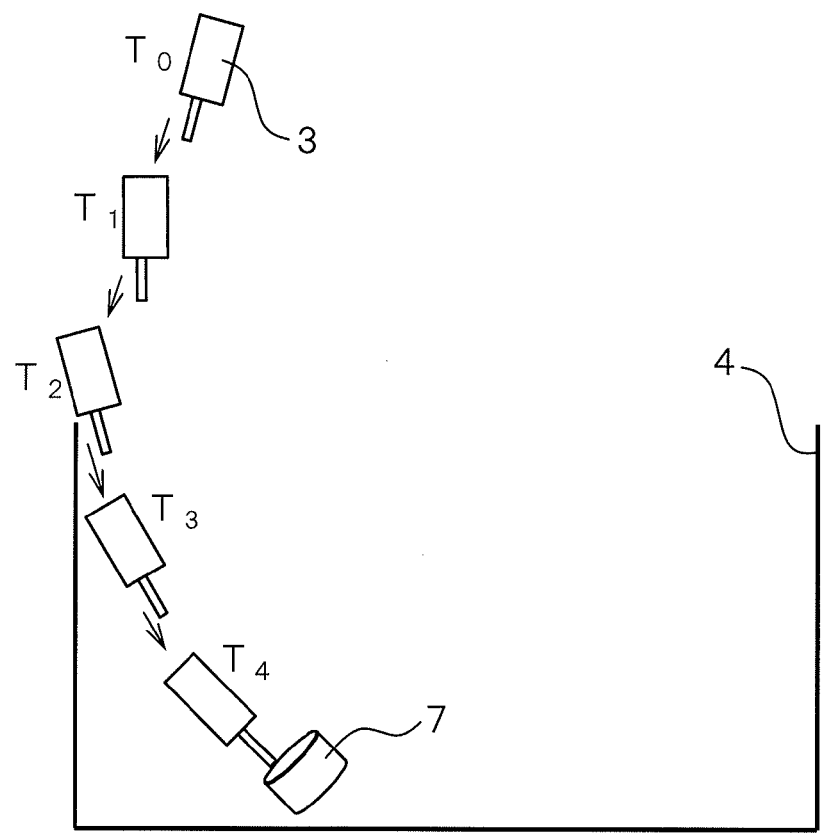
FIG. 5 shows the positional relationship between the tool, the container box and a workpiece, wherein the position and orientation of the tool at each time point are indicated when a division number is four.

FIG. 5 shows the positional relationship between tool 3, container box 4 and workpiece 7, wherein the position and orientation of tool 3 at each time point are indicated when the division number is four (n=4). In this case, the movement time is 2.0 seconds, and the length of the movement path is 400 millimeters. Therefore, when the movement time is equally divided into four, five time points (0.0, 0.5, 1.0, 1.5 and 2.0 sec) are generated, and the length of the movement path between the adjacent time points is 100 millimeters.

Next, a variable j is set to 2 (j←2), and a convex hull $D'_1$ of the tool is calculated (step 104). First, in relation to area $D_1$ occupied by tool 3, apexes of convex hull $D'_1$ are calculated. The "convex hull" means a minimum set including (in the sense of inclusion relation) a line segment extending between arbitrary two points of a given set. In other words, the convex hull means a minimum convex shape including a whole set of points, i.e., a polyhedron formed by line segments between outermost points in the set of points. Therefore, when area $D_1$ is a polyhedron, convex hull $D'_1$ is also a convex polyhedron. Apexes of convex hull $D'_1$ can be calculated by means of each apex of polyhedron area $D_1$, for example, by using an algorithm referred to as "QuickHull" ("The Quickhull Algorithm for Convex Hulls" ACM Translations on Mathematical Software, Vol. 22, No. 4, December 1996").

Figure 6:
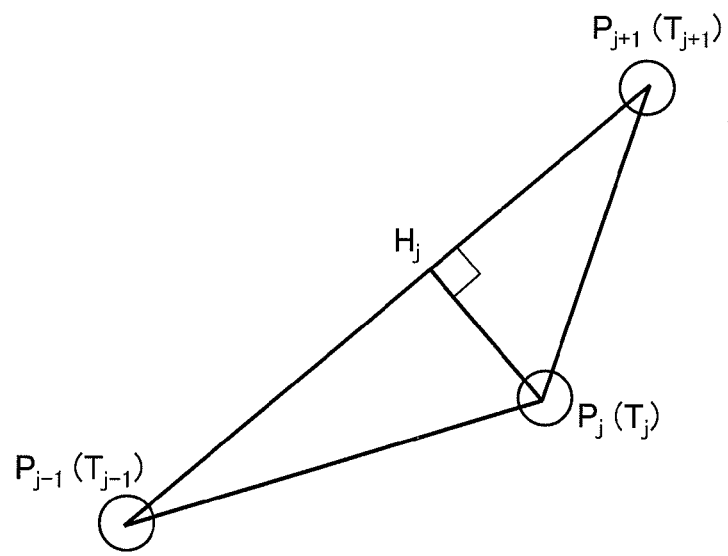
FIG. 6 shows a diagram explaining an example for calculating a straightness at an apex of the polyhedron at each time point.

Next, in step 105, the straightness of $L_j$ at time point $T_j$ is calculated. Concretely, as shown in FIG. 6, in relation to each apex V of convex hull $D'_1$ calculated in step 104, the positions of each apex V at time points $T_{j-1}$ and $T_{j+1}$ are determined as $P_{j-1}$, $P_j$ and $P_{j+1}$, respectively, and an end point of a vertical line extending from point $P_j$ to a segment $P_{j-1}P_{j+1}$ is determined as $H_j$. In this case, straightness $L_{v,j}$ of apex V at time point $T_j$ is calculated by following equation (1).

$$L_{v,j} = \frac{\overline{P_{j-1}P_{j+1}}}{\overline{P_{j-1}P_{j+1}} + \overline{P_jH_j}} \tag{1}$$

Further, a minimum value among straightness $L_{v,j}$ of all apexes at time point $T_j$ is determined as straightness $L_j$ at time point $T_j$ of tool 3 (step 105). Straightness $L_{v,j}$ may vary from 0 to 1, as the straightness is close to 1, a polygonal line $P_{j-1}P_jP_{j+1}$ is close to a straight line. Then, in relation to a positive value $\epsilon$ which is close to zero and previously stored in the robot controller, the magnitude relationship between straightness $L_j$ and $(1-\epsilon)$ is judged (step 106).

When $L_j$ is larger than $(1-\epsilon)$, time point $T_j$ is removed from the time series data, by the following substitution, i.e., $T_j \leftarrow T_{j+1}$, $T_{j+1} \leftarrow T_{j+2}$, . . . , $T_{n-1} \leftarrow T_n$, n←n−1 (step 107). By virtue of this, without substantially decreasing the accuracy of the interference prediction, the number of the convex hulls (calculated in the following step) is decreased by one, whereby the calculation time may be reduced. The reason why the accuracy of the interference prediction is not decreased will be explained below.

In step 108, the magnitude relationship between j and (n−1) is judged. When j<(n−1), the substitution j←j+1 is carried out (step 109) and the procedure is returned to step 105, in order to check straightness $L_j$ at each time point until j is equal to or larger than (n−1).

Next, the substitution j←1 is carried out (step 110), convex hull $C_j$ defined by areas $D_{1,j−1}$ and $D_{1,j}$ at adjacent time points $T_{j−1}$ and $T_j$ is calculated (step 111), wherein the area occupied by tool 3 at each time point $T_j$ (j=1, 2, . . . , n) is referred to as area $D_{1,j}$. Area $D_{1,j}$ is formed by rigid-body transformation of area $D_1$ in the 3D space corresponding to the movement distance of tool 3 at each time point $T_j$. Since area $D_1$ is a polyhedron, area $D_{1,j}$ is also a polyhedron, and thus convex hull $C_j$ of areas $D_{1,j−1}$ and $D_{1,j}$ is a convex polyhedron.

The detail of step 111 is explained below. First, each apex of convex hull $C_j$ is calculated from each apex of polyhedron areas $D_{1,j−1}$ and area $D_{1,j}$, by using "Quickhull" as explained above or the like. Next, each side of convex hull $C_j$ is calculated, wherein, in relation to all combinations of two apexes $(V_1, V_2)$ of convex hull $C_j$, it is judged whether line segment $V_1V_2$ corresponds to the side of convex hull $C_j$, according to the following procedure. All apexes of convex hull $C_j$ are orthographically projected on a plane Π which is perpendicular to line segment $V_1V_2$. At this point, apexes $V_1$ and $V_2$ are projected to an identical point P on plane Π. On plane Π, when point P is positioned at the apex or on the side of the convex hull of all orthographically projected points, it is judged that line segment $V_1V_2$ corresponds to the side of convex hull $C_j$. The apexes of the convex hull on the plane can be calculated by "Quickhull" or the like.

Figure 7:
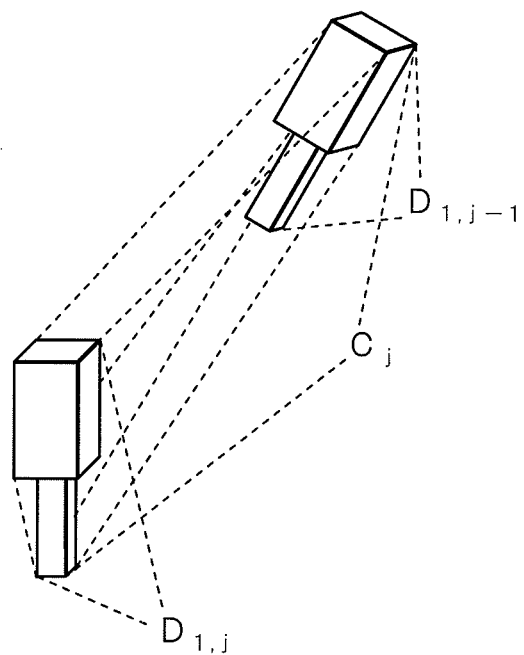
FIG. 7 shows an example for calculating a convex hull from a polyhedron area.

It is judged whether a line segment $P_1P_2$, extending between apexes $P_1$ and $P_2$ of the convex hull on the plane, corresponds to the side of the convex hull, as explained below. All apexes of the convex hull are orthographically projected on a straight line λ which is perpendicular to line segment $P_1P_2$. Then, on straight line λ, when a point which represents orthographically projected line segment $P_1P_2$ exists on one end of a line segment which represents the convex hull of these points, it is judged that line segment $P_1P_2$ corresponds to the side of the convex hull. Similarly, in relation to all combinations of three sides of convex hull $C_j$ each of which forms a triangle, all apexes of convex hull $C_j$ are orthographically projected on a straight line Λ which is perpendicular to a plane including the triangle. Then, on straight line Λ, when a point which represents the orthographically projected triangle exists on one end of a line segment which represents the convex hull of these points, it is judged that the triangle corresponds to a surface of convex hull $C_j$. FIG. 7 shows an example of areas $D_{1,j−1}$ and $D_{1,j}$, and convex hull $C_j$ calculated therefrom. When areas $D_{1,j−1}$ and $D_{1,j}$ substantially correspond to tool 3 at each time point represented by solid lines, convex hull $C_j$ is represented by an area formed by adding a dashed lined area to areas $D_{1,j−1}$ and $D_{1,j}$.

Figure 8:
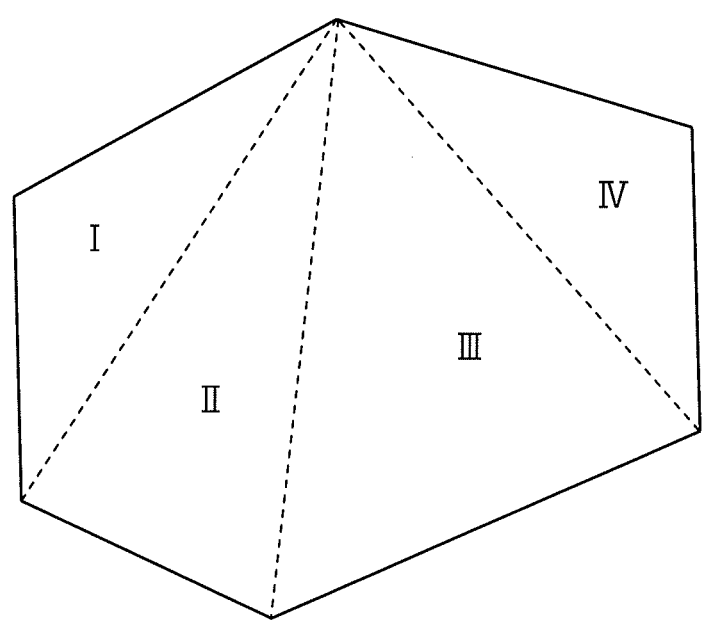
FIG. 8 shows an example wherein a polygon is divided into a plurality of triangles.

Next, it is judged whether a common area or overlap area exists between convex hull $C_j$ and polyhedron area $D_2$ (step 112). Since polyhedron area $D_2$ is represented by a summation of a plurality of convex polyhedron areas $D_{2,j'}$, if the common area exists between convex hull $C_j$ and any combination of convex polyhedron areas $D_{2,j'}$, it can be said that the common area exists between convex hull $C_j$ and polyhedron area $D_2$. Since all surfaces of convex hull $C_j$ and convex polyhedron areas $D_{2,j'}$ are polygons, any of the surfaces can be divided into a plurality of triangles, as shown in FIG. 8 (in FIG. 8, a hexagon is divided into four triangles I to IV). In other words, any of convex hull $C_j$ and convex polyhedron areas $D_{2,j'}$ may be represented as a closed region defined by triangles only. Therefore, existence or non-existence of the common area may be judged based on at least one of following three conditions: (i) whether one or more combination exists, wherein a triangle defining convex hull $C_j$ intersects with a side (or a line segment) of a triangle defining convex polyhedron areas $D_{2,j'}$; (ii) whether one or more combination exists, wherein a side (or a line segment) of a triangle defining convex hull $C_j$ intersects with a triangle defining convex polyhedron areas $D_{2,j'}$; and (iii) whether convex hull $C_j$ completely includes convex polyhedron areas $D_{2,j'}$ or vice versa.

The intersection between the line segment and the triangle is judged as follows. Spatial coordinate values of end points $A_1$ and $A_2$ of the line segment are referred to as $α_1$ and $α_2$, respectively, and spatial coordinate values of apexes $B_1$, $B_2$ and $B_3$ of the triangle are referred to as $β_1$, $β_2$ and $β_3$, respectively. Coordinate values $α_1$, $α_2$, $β_1$, $β_2$ and $β_3$ are represented by three-dimensional vectors. First, it is judged whether a 3×3 matrix $(α_1−α_2, β_1−β_3, β_2−β_3)$ is a regular matrix. If the 3×3 matrix is a regular matrix, it is judged that line segment $A_1A_2$ and triangle $B_1B_2B_3$ are not parallel to each other. Otherwise, if the 3×3 matrix is a singular matrix, it is judged that line segment $A_1A_2$ and triangle $B_1B_2B_3$ are parallel to each other.

When line segment $A_1A_2$ and triangle $B_1B_2B_3$ are not parallel to each other, a spatial coordinate value x, which corresponds to an intersection between a straight line including line segment $A_1A_2$ and a plane including triangle $B_1B_2B_3$, is uniquely represented by the following equation.

$$x=s_1α_1+s_2α_2, x=t_1β_1+t_2β_2+t_3β_3$$

In the above equation, $s_1$, $s_2$, $t_1$, $t_2$ and $t_3$ are real numbers which satisfy the following equation.

$$s_1+s_2=1, t_1+t_2+t_3=1$$

When all of calculated $s_1$, $s_2$, $t_1$, $t_2$ and $t_3$ are equal to or larger than zero and equal to or less than one, it is judged that line segment $A_1A_2$ intersects with triangle $B_1B_2B_3$. On the other hand, when line segment $A_1A_2$ and triangle $B_1B_2B_3$ are parallel to each other, the distance between point $A_1$ and plane $B_1B_2B_3$ is calculated. If the calculated distance is equal to zero, line segment $A_1A_2$ and triangle $B_1B_2B_3$ lie on the same plane.

In the case that line segment $A_1A_2$ and triangle $B_1B_2B_3$ lie on the same plane, when a 2×2 matrix $(α_1−α_2, β_1−β_2)$ is a regular matrix, line segment $A_1A_2$ and side $B_1B_2$ of triangle $B_1B_2B_3$ are not parallel to each other. Then, a spatial coordinate value y, which corresponds to an intersection between a straight line including line segment $A_1A_2$ and a straight line including side $B_1B_2$, is uniquely represented by the following equation.

$$y=s_1α_1+s_2α_2, y=t_1β_1+t_2β_2$$

In the above equation, $s_1$, $s_2$, $t_1$ and $t_2$ are real numbers which satisfy the following equation.

$$s_1+s_2=1, t_1+t_2=1$$

When all of calculated $s_1$, $s_2$, $t_1$ and $t_2$ are equal to or larger than zero and equal to or less than one, it is judged that line segment $A_1A_2$ intersects with side $B_1B_2$, and thus line segment $A_1A_2$ intersects with triangle $B_1B_2B_3$. When line segment $A_1A_2$ and triangle $B_1B_2B_3$ lie on the same plane, the intersection between line segment $A_1A_2$ and side $B_2B_3$ and the intersection between line segment $A_1A_2$ and side $B_3B_1$ are also judged, similarly to the case of side $B_1B_2$, in order to judge the intersection between line segment $A_1A_2$ and triangle $B_1B_2B_3$. When none of the sides of triangle $B_1B_2B_3$ intersects with line segment $A_1A_2$, it is judged that line segment $A_1A_2$ does not intersect with and triangle $B_1B_2B_3$.

Whether convex hull $C_j$ completely includes convex polyhedron areas $D_{2,j}$ or not can be judged, by judging whether a line segment extending between the gravity center of convex hull $C_j$ and each of all apexes of convex polyhedron areas $D_{2,j}$ does not intersect with a surface of convex hull $C_j$ or intersects. Similarly, whether convex polyhedron areas $D_{2,j}$ completely includes convex hull $C_j$ or not can be judged.

As a result of the judgment regarding the existence of the common area, when the common area exists between convex hull $C_j$ and convex polyhedron areas $D_{2,j}$, it is judged that tool 3 interferes with container box 4 on the movement path (step 113), and the procedure is terminated. Otherwise, the common area does not exist, it is judged whether j<n is true or not (step 114).

In step 114, if j<n is true, the procedure progresses to step 109 so as to substitute (j+1) into j (j←j+1), and the procedure is returned to step 105. On the other hand, if j≧n is true in step 114, it is judged that tool 3 does not interfere with container box 4 on the movement path (step 115), and the procedure is terminated.

Figure 9:
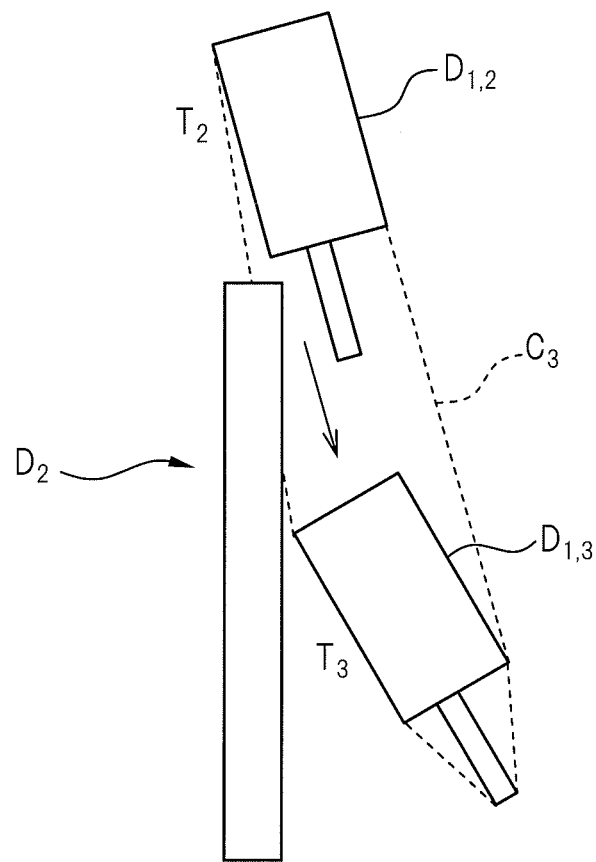
FIG. 9 shows the positional relationship between the convex hull and the polyhedron representing a peripheral object.

FIG. 9 is an enlarged view of a part of FIG. 5 between time points $T_2$ and $T_3$. As shown, there is a common area between convex hull $C_3$ and polyhedron area $D_2$, wherein convex hull $C_3$ includes two areas occupied by tool 3 at time points $T_2$ and $T_3$. Therefore, on the movement path of FIG. 5, it is predicted or judged that tool 3 interferes with container box 4.

The calculation time for judging the existence of the common area between convex hull $C_j$ and area $D_2$ is 1 to 2 milliseconds (ms). Also, the time for calculating convex hull $C_j$ from two areas $D_{1,j-1}$ and $D_{1,j}$ is 1 to 2 ms. In the case of FIG. 5, since division number n of the movement time of the robot is four, the calculation time for predicting interference is at most 16 ms (=(2+2)×4). Such calculation time does not affect the motion of the robot. As explained above, when polygonal line $P_{j-1}P_jP_{j+1}$, representing the movement of each apex of the convex hull of area $D_1$ occupied by tool 3, is close to a straight line (i.e., straightness $L_j$ is close to 1), the accuracy of the interference prediction is not substantially decreased, even if time point $T_j$ is removed from the time series data in step 107. This is because, when polygonal line $P_{j-1}P_jP_{j+1}$ is close to a straight line, a summation of the convex hull of areas $D_{1,j-1}$, $D_{1,j}$ and the convex hull of areas $D_{1,j}$, $D_{1,j+1}$ generally coincides with the convex hull of areas $D_{1,j-1}$, $D_{1,j+1}$. Therefore, when the interference is judged based on the existence of the common area between the convex hull and polyhedron area $D_2$, the accuracy of the interference prediction is not substantially decreased, even if time point $T_j$ is removed from the time series data.

As described above, in the present invention, the areas occupied by the target section at some interpolated positions on the movement path are calculated, all convex hulls, which are combinations of areas of adjacent interpolated positions, are calculated, the peripheral object is represented by a summation of convex polyhedrons, and the interference between all convex hulls and all convex polyhedrons is judged, in order to predict the interference between the target section and the peripheral object when the target section is moved along with the movement path.

According to the present invention, the interference may be automatically predicted at practical accuracy and calculation time, immediately before the motion. Therefore, in the application of picking workpieces which are randomly piled or the like, the robot may be operated while avoiding the interference. Further, in the invention, the convex hull (or a region of a convex polyhedron), which is a combination of areas of adjacent interpolated positions of the target section of the robot, is calculated, the peripheral object is represented by a summation of convex polyhedrons, so that the interference prediction between the target section and the peripheral object can be carried out by judging the interference between the convex hull and the summation of convex polyhedrons. Therefore, the calculation may be simplified and accelerated, whereby the interference prediction may be carried out in real time during the operation of the robot.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A method for predicting interference, wherein the method comprising the steps of:
   storing a peripheral occupied area which is an area occupied by a peripheral approximated polyhedron which is a polyhedral approximation of a shape of a peripheral object fixed in a space, and a target section approximated polyhedron which is a polyhedral approximation of a target section of a robot;
   calculating, by a processor, a plurality of target section occupied areas which are occupied by the target section approximated polyhedron at a plurality of time points, according to a motion of the robot; and
   predicting interference between the target section of the robot and the peripheral object based on the plurality of target section occupied areas and the peripheral occupied area,
   wherein the predicting step comprises the steps of:
      calculating all convex hulls which are combinations of adjacent target section occupied areas when the plurality of target section occupied areas are aligned according to the order of the plurality of time points;
      calculating the peripheral occupied area as a combination of convex polyhedrons; and
      judging whether the interference between the target section of the robot and the peripheral object occurs, by judging whether a common area exists between any of the convex hulls and the convex polyhedrons.

2. An apparatus for predicting interference, wherein the apparatus comprising:
   a robot controller having:
      a storing part configured to store a peripheral occupied area which is an area occupied by a peripheral approximated polyhedron which is a polyhedral approximation of a shape of a peripheral object fixed in a space, and a target section approximated polyhedron which is a polyhedral approximation of a target section of a robot;
      a target section occupied area calculating part configured to calculate a plurality of target section occupied areas which are occupied by the target section approximated polyhedron at a plurality of time points, according to a motion of the robot; and
      an interference predicting part configured to predict interference between the target section of the robot and the peripheral object based on the plurality of target section occupied areas and the peripheral occupied area,
      wherein the interference predicting part comprises:
         a convex hull calculating part configured to calculate all convex hulls which are combinations of adjacent target section occupied areas when the plurality of target section occupied areas are aligned according to the order of the plurality of time points; and a peripheral occupied area calculating part configured to calculate the peripheral occupied area as a combination of convex polyhedrons, and wherein the interference predicting part judges whether the interference between the target section of the robot and the peripheral object occurs, by judging whether a common area exists between any of the convex hulls and the convex polyhedrons.

* * * * *